(12) United States Patent
Parsons et al.

(10) Patent No.: US 6,299,802 B1
(45) Date of Patent: Oct. 9, 2001

(54) METHOD OF PRODUCING OPTICAL MEDIA DISCS FROM HYDROGENATED BLOCK COPOLYMERS

(75) Inventors: Gary D. Parsons, Midland; James P. Maher, Freeland, both of MI (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/640,632

(22) Filed: Aug. 17, 2000

Related U.S. Application Data

(60) Provisional application No. 60/152,801, filed on Sep. 8, 1999.

(51) Int. Cl.[7] ............................................. B29D 11/00
(52) U.S. Cl. ..................................... 264/1.33; 264/328.1
(58) Field of Search ............................ 264/1.1, 1.33, 264/106, 107, 328.1; 428/64.1, 913; 369/283

(56) References Cited

U.S. PATENT DOCUMENTS

| 4,911,966 | | 3/1990 | Murayama et al. . |
| 6,030,680 | * | 2/2000 | Hahn et al. . |
| 6,117,284 | * | 9/2000 | Mueller . |

FOREIGN PATENT DOCUMENTS

| 405843 | 1/1991 | (EP) . |
| 589041 | 3/1994 | (EP) . |
| 713893 | 5/1996 | (EP) . |
| 505110 | 8/1996 | (EP) . |
| 1318015 | 12/1989 | (JP) . |
| 1294721 | 3/1998 | (JP) . |

OTHER PUBLICATIONS

*The Compact Disk Handbook*, p. 295–299, 2nd edition, Pohlmann.

*Injection Molding an Introduction*, p. 171–172, Potsch et al, Hanser/Gardner/Publication, Inc., 1995.

* cited by examiner

*Primary Examiner*—Mathieu D. Vargot

(57) ABSTRACT

The present invention relates to a process for producing DVD's using injection molding techniques, without the use of compression, from a polymer having a glass transition temperature (Tg) of greater than 110° C. as measured by Differential Scanning Calorimetry (DSC) at 10° C./min., an elastic modulus (G') of less than or equal to 1000 dynes/cm$^2$ at a temperature of 240° C., as measured by Dynamic Mechanical Spectroscopy measurements at a temperature ramp rate of 3° C./min., and a shear rate of 1 radian/sec using a parallel plate geometry (under nitrogen), and a complex viscosity (Eta*) of less than 2000 poise, as measured according to Dynamic Mechanical Spectroscopy measurements, using shear rate sweeps at 280° C., and a shear rate of 1 radian/sec using a parallel plate geometry (under nitrogen).

8 Claims, No Drawings

METHOD OF PRODUCING OPTICAL MEDIA DISCS FROM HYDROGENATED BLOCK COPOLYMERS

CROSS REFERENCE STATEMENT

This application claims the benefit of U.S. Provisional Application No. 60/152,801, filed Sep. 8, 1999.

BACKGROUND OF THE INVENTION

The present invention relates to a method for producing optical media discs.

Optical media discs have been prepared previously using molding techniques such as those described in The Compact Disc Handbook, 2nd edition, by Pohlmann. Methods of molding optical media discs are well known in the art and include injection and injection-compression molding. Compact discs (CD's) have a thickness of approximately 1.2 mm and are typically made using standard injection molding techniques. However, Digital Versatile Discs (DVD's) have a layer thickness of 0.6 mm and require injection compression-molding as described in *Injection Molding An Introduction*, pgs. 171–172 Hanser/Gardner/ Publication, Inc., Cincinnati, 1995 by Potsch and Michaeli. Injection-compression is an enhanced injection molding process where the mold is left slightly ajar at the beginning of the cavity fill stage. The cavity is clamped completely closed to the desired final part thickness of 0.6 mm during the filling phase. Injection-compression is required in order to achieve adequate data transfer to a 0.6 mm substrate surface while achieving low birefringence in polycarbonate discs. Unfortunately compression-injection molding requires increased processing complexity, thus requiring purchase of new processing equipment or costly modification of existing standard injection molding equipment.

Therefore, there remains a need for a process for producing DVD's using standard injection molding equipment while maintaining acceptable data transfer, cycle time and low birefringence.

SUMMARY OF THE INVENTION

It has been surprisingly discovered that DVD's having a thickness of approximately 0.6 mm can be manufactured using an injection molding process, without the use of compression, when the discs are made from a polymer having 1) a glass transition temperature (Tg) of greater than 110° C. as measured by Differential Scanning Calorimetry (DSC) at 10° C./min.,
2) an elastic modulus (G') of less than or equal to 1000 dynes/cm$^2$ at a temperature of 240° C., as measured by Dynamic Mechanical Spectroscopy measurements at a temperature ramp rate of 3° C./min., and
3) a shear rate of 1 radian/sec using a parallel plate geometry (under nitrogen), and a complex viscosity (Eta*) of less than 2000 poise, as measured according to Dynamic Mechanical Spectroscopy measurements, using shear rate sweeps at 280° C., and a shear rate of 1 radian/sec using a parallel plate geometry (under nitrogen).

It is surprising that a injection molding process, without compression, can be used to prepare DVD's having a thickness of approximately 0.6 mm, while maintaining good data transfer and low birefringence.

DESCRIPTION OF THE PREFERRED EMBODIMENTS

The present invention relates to a process for producing DVD's using injection molding techniques, without the use of compression, from a polymer having a glass transition temperature (Tg) of greater than 110° C., an elastic modulus (G') of less than or equal to 1000 dynes/cm$^2$ at a temperature of 240° C., and a complex viscosity (Eta*) of less than 2000 poise.

In the process of the present invention, an injection molding process is used to produce a DVD having a single disc layer thickness of approximately 0.6 mm. Injection molding techniques are well known in the art and described in *The CompactDisc Handbook*, 2$^{nd}$ edition by Pohlman, pages 295–296 and in *Injection Molding An Introduction*, pgs. 1–12, Hanser/Gardner/ Publication, Inc., Cincinnati, 1995 by Potsch and Michaeli. In one embodiment, molten polymer is injected into a mold cavity, with the stamper on one face producing a clear plastic disc with the pits impressed on one side.

The injection molding process of the present invention does not use compression during molding. Instead, the mold is closed prior to injection of the molten polymer.

Surprisingly, it as been found that DVD's can be produced using this process from a polymer having:

1) a glass transition temperature (Tg) of greater than 110° C. as measured by Differential Scanning Calorimetry (DSC) at 10° C./min.,
2) an elastic modulus (G') of less than or equal to 1000 dynes/cm$^2$ at a temperature of 240° C., preferably at 225° C., more preferably at 215° C. and most preferably at 210° C., as measured by Dynamic Mechanical Spectroscopy measurements at a temperature ramp rate of 3° C./min., and a shear rate of 1 radian/sec using a parallel plate geometry (under nitrogen), and
3) a complex viscosity (Eta*) of less than 2000 poise, preferably less than 1300 poise, and more preferably less than 600 poise, as measured according to Dynamic Mechanical Spectroscopy measurements, using shear rate sweeps at 280° C., and a shear rate of 1 radian/sec using a parallel plate geometry (under nitrogen).

Polymers which can be used in the process of the present invention include saturated hydrocarbon thermoplastics. The term saturated refers to the amount of olefinic bonds within the chemical structure. As used herein, saturated refers to a polymer wherein less than 10 percent of the carbon-carbon bonds are olefinic or unsaturated in nature, preferably less than 7.5 percent, more preferably less than 5 percent, even more preferably less than 2 percent, and most preferably less than 1.5 percent. These types of polymers include hydrogenated aromatic/conjugated diene block copolymers, cyclic-olefin-copolymers and hydrogenated ring opening metathesis polymers.

Aromatic/conjugated diene block copolymers include block copolymers of a vinyl aromatic monomer and a conjugated diene monomer. The vinyl aromatic monomer is typically a monomer of the formula:

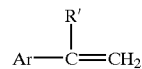

wherein R' is hydrogen or alkyl, Ar is phenyl, halophenyl, alkylphenyl, alkylhalophenyl, naphthyl, pyridinyl, or anthracenyl, wherein any alkyl group contains 1 to 6 carbon atoms which may be mono or multisubstituted with functional groups such as halo, nitro, amino, hydroxy, cyano, carbonyl and carboxyl. More preferably Ar is phenyl or alkyl phenyl with phenyl being most preferred. Typical vinyl aromatic monomers include styrene, alpha-methylstyrene, all isomers of vinyl toluene, especially paravinyltoluene, all isomers of ethyl styrene, propyl styrene, butyl styrene, vinyl biphenyl, vinyl naphthalene, vinyl anthracene and the like, and mixtures thereof. Block copolymers containing 5 or more blocks can contain more than one specific polymerized vinyl aromatic monomer. In other words, for example, a pentablock copolymer can contain a polystyrene block and a poly-alpha-methylstyrene block. The hydrogenated vinyl aromatic polymer block may also be a copolymer of a vinyl aromatic wherein the vinyl aromatic portion is at least 50 weight percent of the copolymer. Preferably, the vinyl aromatic polymer block is a styrene polymer block.

The conjugated diene monomer can be any monomer having two conjugated double bonds. Such monomers include for example 1,3-butadiene, 2-methyl-1,3-butadiene, 2-methyl-1,3 pentadiene, isoprene and similar compounds, and mixtures thereof. Preferably, the conjugated diene is a butadiene.

The conjugated diene polymer block can be prepared from materials which remain amorphous after the hydrogenation process, or materials which are capable of crystallization after hydrogenation. Hydrogenated polyisoprene blocks remain amorphous, while hydrogenated polybutadiene blocks can be either amorphous or crystallizable depending upon their structure. Polybutadiene can contain either a 1,2 configuration, which hydrogenates to give the equivalent of a 1-butene repeat unit, or a 1,4-configuration, which hydrogenates to give the equivalent of an ethylene repeat unit. Polybutadiene blocks having at least approximately 40 weight percent 1,2-butadiene content, based on the weight of the polybutadiene block, provides substantially amorphous blocks with low glass transition temperatures upon hydrogenation. Polybutadiene blocks having less than approximately 40 weight percent 1,2-butadiene content, based on the weight of the polybutadiene block, provide crystalline blocks upon hydrogenation. It may be desirable to incorporate a crystalline block (to improve solvent resistance) or an amorphous, more compliant block. One way of achieving low birefringence is in the control of the 1,2 to 1,4 content of the polybutadiene block. In one embodiment, the weight ratio of 1,2 to 1,4 content of the polybutadiene block is greater than 20:80, generally greater than 25:75, preferably greater than 30:70, and more preferably greater than 35:65. In cases where the weight ratio of 1,2 to 1,4 content of the polybutadiene block is 1:5 or less, the birefringence can be controlled by incorporating a hydrogenated polybutadiene polymer block having generally 120 monomer units or less, typically 115 monomer units or less, characteristically 110 monomer units or less, preferably 105 monomer units or less, more preferably 95 monomer units or less, even more preferably 90 monomer units or less and most preferably 85 monomer units or less.

In some applications, the block copolymer can contain more than one conjugated diene polymer block, such as a polybutadiene block and a polyisoprene block. The conjugated diene polymer block may also be a copolymer of a conjugated diene, wherein the conjugated diene portion of the copolymer is at least 50 weight percent of the copolymer.

Other polymeric blocks may also be included in the vinyl aromatic/conjugated diene block copolymers.

A block is herein defined as a polymeric segment of a copolymer which exhibits microphase separation from a structurally or compositionally different polymeric segment of the copolymer. Microphase separation occurs due to the incompatibility of the polymeric segments within the block copolymer. Microphase separation and block copolymers are widely discussed in "Block Copolymers-Designer Soft Materials", PHYSICS TODAY, February, 1999, pages 32–38.

The hydrogenated block copolymers typically contain from 65 to 90 weight percent of a hydrogenated vinyl aromatic polymer, e.g. polyvinylcyclohexane or PVCH block, preferably from 70, more preferably from 75, to 90 weight percent, preferably to 85, based on the total weight of the hydrogenated block copolymer.

The hydrogenated block copolymers of the present invention typically contain from 10 to 35 weight percent of a hydrogenated conjugated diene polymer block, preferably from 12, to 30 weight percent, preferably to 25, more preferably to 20, based on the total weight of the copolymer.

The hydrogenated block copolymers are produced by the hydrogenation of block copolymers including triblock, multiblock, tapered block, and star block copolymers such as SBS, SBSBS, SIS, SISIS, SISBS and the like (wherein S is polystyrene, B is polybutadiene and I is polyisoprene). The block copolymers comprise at least two aromatic polymer blocks and at least one conjugated diene polymer block, producing a block copolymer of at least two hydrogenated aromatic polymer blocks and at least one hydrogenated conjugated diene polymer blocks after hydrogenation. The block copolymers contain at least one triblock segment comprised of a vinyl aromatic polymer block on each end. The block copolymers may, however, contain any number of additional blocks, wherein these blocks may be attached at any point to the triblock polymer backbone. Thus, linear blocks would include for example SBS, SBSB, SBSBS, SBSBSB, and the like. The copolymer can also be branched, wherein polymer chains are attached at any point along the copolymer backbone. In one embodiment, the polymer is a pentablock polymer comprising five alternating blocks, wherein the blocks consist of three vinyl aromatic polymer blocks and two conjugated diene polymers blocks.

The total number average molecular weight ($Mn_t$) of the hydrogenated block copolymers is typically from 30,000, preferably from 32,000, more preferably from 35,000 and most preferably from 40,000 to 70,000, preferably to 68,000, more preferably to 65,000. Number average molecular weight (Mn) as referred to throughout this application is determined using gel permeation chromatography (GPC). The molecular weight of the hydrogenated block copolymer and properties obtained are dependent upon the molecular weight of each of the hydrogenated polymeric blocks. It has been discovered that by optimizing the molecular weight of the hydrogenated polymeric blocks, hydrogenated block copolymers of low molecular weight (30,000 to 70,000) can achieve high heat distortion temperatures and excellent toughness and tensile strength properties. Surprisingly, it has been discovered that good physical properties can be obtained at relatively low hydrogenated block copolymer molecular weights which gives superior processability.

Methods of making block copolymers are well known in the art. Typically, block copolymers are made by anionic polymerization, examples of which are cited in *Anionic Polymerization: Principles and Practical Applications*, H. L. Hsieh and R. P. Quirk, Marcel Dekker, New York, 1996. In one embodiment, block copolymers are made by sequential monomer addition to a carbanionic initiator such as sec-butyl lithium or n-butyl lithium. In another embodiment, the copolymer is made by coupling a triblock material with a divalent coupling agent such as 1,2-dibromoethane, dichlorodimethylsilane, or phenylbenzoate. In this embodiment, a small chain (less than 10 monomer repeat units) of a conjugated diene polymer can be reacted with the vinyl aromatic polymer coupling end to facilitate the coupling reaction. Vinyl aromatic polymer blocks are typically difficult to couple, therefore, this technique is commonly used to achieve coupling of the vinyl aromatic polymer ends. The small chain of diene polymer does not constitute a distinct block since no microphase separation is achieved. Coupling reagents and strategies which have been demonstrated for a variety of anionic polymerizations are discussed in Hsieh and Quirk, Chapter 12, pgs. 307–331. In another embodiment, a difunctional anionic initiator is used to initiate the polymerization from the center of the block system, wherein subsequent monomer additions add equally to both ends of the growing polymer chain. An example of a such a difunctional initiator is 1,3-bis(1-phenylethenyl) benzene treated with organolithium compounds, as described in U.S. Pat. Nos. 4,200,718 and 4,196,154 which are herein incorporated by reference.

After preparation of the block copolymer, the copolymer is hydrogenated to remove sites of unsaturation in both the conjugated diene polymer block and the vinyl aromatic polymer block segments of the copolymer. Any method of hydrogenation can be used and such methods typically include the use of metal catalysts supported on an inorganic substrate, such as Pd on BaSO4 (U.S. Pat. No. 5,352,744) and Ni on kieselguhr (U.S. Pat. No. 3,333,024) both of which are incorporated herein by reference. Additionally, soluble, homogeneous catalysts such those prepared from combinations of transition metal salts of 2-ethylhexanoic acid and alkyl lithiums can be used to fully saturate block copolymers, as described in Die Makromolekulare Chemie, Volume 160, pp. 291, 1972. The copolymer hydrogenation can also be achieved using hydrogen and a heterogeneous catalyst such as those described in U.S. Pat. No. 5,352,744, U.S. Pat. No. 5,612422 and U.S. Pat. No. 5,645,253, which are herein incorporated by reference. The catalysts described therein are heterogeneous catalysts consisting of a metal crystallite supported on a porous silica substrate. An example of a silica supported catalyst which is especially useful in the polymer hydrogenation is a silica which has a surface area of at least 10 $m^2/g$ and which is synthesized such that is contains pores with diameters ranging between 3000 and 6000 angstroms. This silica is then impregnated with a metal capable of catalyzing hydrogenation of the polymer, such as nickel, cobalt, rhodium, ruthenium, palladium, platinum, other Group VIII metals, combinations or alloys thereof. Other heterogeneous catalysts can also be used, having diameters in the range of 500 to 3,000 angstroms.

Alternatively, the polymer can be hydrogenated using a mixed hydrogenation catalyst. The mixed hydrogenation catalyst is characterized in that it comprises a mixture of at least two components. The first component comprises any metal which will increase the rate of hydrogenation and includes nickel, cobalt, rhodium, ruthenium, palladium, platinum, other Group VIII metals, or combinations thereof. Preferably rhodium and/or platinum is used. However, platinum is known to be a poor hydrogenation catalyst for nitrites, therefore, platinum would not be preferred in the hydrogenation of nitrile copolymers. The second component used in the mixed hydrogenation catalyst comprises a promoter which inhibits deactivation of the Group VIII metal(s) upon exposure to polar materials, and is herein referred to as the deactivation resistant component. Such components preferably comprise rhenium, molybdenum, tungsten, tantalum or niobium or mixtures thereof.

The amount of the deactivation resistant component is at least an amount which significantly inhibits the deactivation of the Group VIII metal component when exposed to polar impurities within a polymer composition, herein referred to as a deactivation inhibiting amount. Deactivation of the Group VIII metal is evidenced by a significant decrease in hydrogenation reaction rate. This is exemplified in comparisons of a mixed hydrogenation catalyst and a catalyst containing only a Group VIII metal component under identical conditions in the presence of a polar impurity, wherein the catalyst containing only a Group VIII metal component exhibits a hydrogenation reaction rate which is less than 75 percent of the rate achieved with the mixed hydrogenation catalyst.

Preferably, the amount of deactivation resistant component is such that the ratio of the Group VIII metal component to the deactivation resistant component is from 0.5:1 to 10:1, more preferably from 1:1 to 7:1, and most preferably from 1:1 to 5:1.

The catalyst can consist of the components alone, but preferably the catalyst additionally comprises a support on which the components are deposited. In one embodiment, the metals are deposited on a support such as a silica, alumina or carbon. In a more specific embodiment, a silica support having a narrow pore size distribution and surface area greater than 10 meters squared per gram ($m^2/g$) is used.

The pore size distribution, pore volume, and average pore diameter of the support can be obtained via mercury porosimetry following the proceedings of ASTM D-4284-83.

The pore size distribution is typically measured using mercury porosimetry. However, this method is only sufficient for measuring pores of greater than 60 angstroms. Therefore, an additional method must be used to measure pores less than 60 angstroms. One such method is nitrogen desorption according to ASTM D-4641-87 for pore diameters of less than about 600 angstroms. Therefore, narrow pore size distribution is defined as the requirement that at least 98 percent of the pore volume is defined by pores having pore diameters greater than 300 angstroms and that the pore volume measured by nitrogen desorption for pores less than 300 angstroms, be less than 2 percent of the total pore volume measured by mercury porosimetry.

The surface area can be measured according to ASTM D-3663-84. The surface area is typically between 10 and 100 $m^2/g$, preferably between 15 and 90 with most preferably between 50 and 85 $m^2/g$.

The desired average pore diameter is dependent upon the polymer which is to be hydrogenated and its molecular weight (Mn). It is preferable to use supports having higher average pore diameters for the hydrogenation of polymers having higher molecular weights to obtain the desired amount of hydrogenation. For high molecular weight polymers (Mn>200,000 for example), the typical desired surface area can vary from 15 to 25 $m^2/g$ and the desired average pore diameter from 3,000 to 4000 angstroms. For lower molecular weight polymers (Mn<100,000 for example), the typical desired surface area can vary from 45 to 85 $m^2/g$ and the desired average pore diameter from 300 to 700 angstroms although larger pore diameters are also acceptable.

Silica supports are preferred and can be made by combining potassium silicate in water with a gelation agent, such as formamide, polymerizing and leaching as exemplified in U.S. Pat. No. 4,112,032. The silica is then hydrothermally calcined as in Iler, R. K., *The Chemistry of Silica*, John Wiley and Sons, 1979, pp. 539–544, which generally consists of heating the silica while passing a gas saturated with water over the silica for about 2 hours or more at temperatures from about 600° C. to about 850° C. Hydrothermal calcining results in a narrowing of the pore diameter distribution as well as increasing the average pore diameter. Alternatively, the support can be prepared by processes disclosed in Iler, R. K., *The Chemistry of Silica*, John Wiley and Sons, 1979, pp. 510–581.

A silica supported catalyst can be made using the process described in U.S. Pat. No. 5,110,779, which is incorporated herein by reference. An appropriate metal, metal component, metal containing compound or mixtures thereof, can be deposited on the support by vapor phase deposition, aqueous or nonaqueous impregnation followed by calcination, sublimation or any other conventional method, such as those exemplified in *Studies in Surface Science and Catalysis*, "Successful Design of Catalysts" V.44, pg. 146–158, 1989 and *Applied Heterogeneous Catalysis* pgs. 75–123, Institute Francais du Pétrole Publications, 1987. In methods of impregnation, the appropriate metal containing compound can be any compound containing a metal, as previously described, which will produce a usable hydrogenation catalyst which is resistant to deactivation. These compounds can be salts, coordination complexes, organometallic compounds or covalent complexes.

Typically, the total metal content of the supported catalyst is from 0.1 to 10 wt. percent based on the total weight of the silica supported catalyst. Preferable amounts are from 2 to 8 wt. percent, more preferably 0.5 to 5 wt. percent based on total catalyst weight.

Promoters, such as alkali, alkali earth or lanthanide containing compounds, can also be used to aid in the dispersion of the metal component onto the silica support or stabilization during the reaction.

The amount of supported catalyst used in the hydrogenation process is much smaller than the amount required in conventional unsaturated polymer hydrogenation reactions due to the high reactivity of the hydrogenation catalysts. Generally, amounts of less than I gram of supported catalyst per gram of unsaturated polymer are used, with less than 0.5 gram being preferred and less than 0.2 being more preferred. The amount of supported catalyst used is dependent upon the type of process, whether it is continuous, semi-continuous or batch, and the process conditions, such as temperature, pressure and reaction time wherein typical reaction times may vary from about 5 minutes to about 5 hours. Continuous operations can typically contain 1 part by weight supported catalyst to 200,000 or more parts unsaturated polymer, since the supported catalyst is reused many times during the course of continuous operation. Typical batch processes can use 1 part by weight supported catalyst to 15 parts unsaturated polymer. Higher temperatures and pressures will also enable using smaller amounts of supported catalyst.

The hydrogenation reaction is preferably conducted in a hydrocarbon solvent in which the polymer is soluble and which will not hinder the hydrogenation reaction. The solvent is preferably the same solvent in which the polymerization was conducted. Typically, the polymer solution obtained from the polymerization step is diluted further with additional solvent prior to hydrogenation. Typically, the polymer solution contains from 10 to 25 wt. percent, preferably from 10 to 20 wt. percent polymer based on the total weight of the solution prior to hydrogenation. Preferably the solvent is a saturated solvent such as cyclohexane, methylcyclohexane, ethylcyclohexane, cyclooctane, cycloheptane, dodecane, dioxane, branched hydrocarbons, especially branched hydrocarbons which have no more than one hydrogen atom at the branch point, a boiling temperature of more than 45° C. and an ignition temperature greater than 280° C., isopentane, decahydronaphthalene or mixtures thereof, with cyclohexane being the most preferred.

The temperature at which the hydrogenation is conducted can be any temperature at which hydrogenation occurs without significant degradation of the polymer. Degradation of the polymer can be detected by a decrease in Mn, an increase in polydispersity or a decrease in glass transition temperature, after hydrogenation. Significant degradation in polymers having a polydispersity between 1.0 and about 1.2 can be defined as an increase of 30 percent or more in polydispersity after hydrogenation. Preferably, polymer degradation is such that less than a 20 percent increase in polydispersity occurs after hydrogenation, most preferably less than 10 percent. In polymers having polydispersity greater than about 1.2, a significant decrease in molecular weight after hydrogenation indicates that degradation has occurred. Significant degradation in this case is defined as a decrease in Mn of 20 percent or more. Preferably, a Mn decrease after hydrogenation will be less than 10 percent. However, polymers such as poly-alpha-methylstyrene or other alpha substituted vinyl aromatic polymers which are more prone to polymer degradation, can tolerate a decrease in Mn of up to 30 percent.

Typical hydrogenation temperatures are from about 40° C. preferably from about 100° C., more preferably from about 100° C., and most preferably from about 120° C. to about 250° C., preferably to about 200° C., more preferably to about 180° C., and most preferably to about 170° C.

The pressure of the hydrogenation reaction is not critical, though hydrogenation rates increase with increasing pressure. Typical pressures range from atmospheric pressure to 70 MPa, with 0.7 to 10.3 MPa being preferred.

The reaction vessel is purged with an inert gas to remove oxygen from the reaction area. Inert gases include but are not limited to nitrogen, helium, and argon, with nitrogen being preferred.

The hydrogenating agent can be any hydrogen producing compound which will efficiently hydrogenate the unsaturated polymer. Hydrogenating agents include but are not limited to hydrogen gas, hydrazine and sodium borohydride. In a preferred embodiment, the hydrogenating agent is hydrogen gas.The level of hydrogenation of the block copolymer of the present invention is preferably greater than 95 percent of the conjugated diene polymer block and greater than 90 percent of the vinyl aromatic polymer block segments, more preferably greater than 99 percent of the conjugated diene polymer block and greater than 95 percent of the vinyl aromatic polymer block segments, even more preferably greater than 99.5 percent of the conjugated diene polymer block and greater than 98 percent of the vinyl aromatic polymer block segments, and most preferably greater than 99.9 percent of the conjugated diene polymer block and 98.5 percent of the vinyl aromatic polymer block segments. The term 'level of hydrogenation' refers to the percentage of the original unsaturated bonds which become saturated upon hydrogenation. The level of hydrogenation in hydrogenated vinyl aromatic polymers is determined using UV-VIS spectrophotometry, while the level of hydrogenation in hydrogenated diene polymers is determined using proton NMR.

Cyclic-olefin-copolymers can also be used in the process of the present invention and are copolymerized cycloolefin monomers with other acyclic or cyclic olefin comonomers. Cyclic-olefin-copolymers include norbornene-type polymers as described in U.S. Pat. Nos. 5,115,041, 5,142,007, 5,143,979, all of which are incorporated herein by reference. The cycloolefin moiety may be substituted or unsubstituted. Suitable cycloolefin monomers include substituted and unsubstituted norbornene, dicyclopentadienes, dihydrodicyclopentadienes, trimers of cyclopentadiene, tetracyclododecenes, hexacycloheptadecenes, ethylidenyl norbornene and vinylnorbornenes. Substituents on the cycloolefin monomers include hydrogen, alkyl alkenyl, and aryl groups of 1 to 20 carbon atoms and saturated and unsaturated cyclic groups of 3 to 12 carbon atoms which can be formed with one or more, preferably two, ring carbon atoms. Generally speaking, the substituents on the cycloolefin monomers can be any which do not poison or deactivate the polymerization catalyst. Examples of preferred monomers include but are not limited to dicyclopentadiene, methyltetracyclododecene, 2-norbornene, and other norbornene monomers such as 5-methyl-2-norbornene, 5,6-dimethyl-2-norbornene, 5-ethyl-2-norbornene, 5-ethylidenyl-2-norbornene, 5-butyl-2-norbornene, 5-hexyl-2-norbornene, 5-octyl-2-norbornene, 5-phenyl-2-norbornene, 5-dodecyl-2-norbornene, 5-isobutyl-2-norbornene, 5-octadecyl-2-norbornene, 5-isopropyl-2-norbornene, 5-p-toluyl-2-norbornene, 5-α-naphthyl-2-norbornene, 5-cyclohexyl-2-norbornene, 5-isopropenyl-2-norbornene, 5-vinyl-2-norbornene, 5,5-dimethyl-2-norbornene, tricyclopentadiene (or cyclopentadiene trimer), tetracyclopentadiene (or cyclopentadiene tetramer), dihydrodicyclopentadiene (or cyclopentene-cyclopentadiene co-dimer), methyl-cyclopentadiene dimer, ethyl-cyclopentadiene dimer, tetracyclododecene 9-methyl-tetracyclo [6,2,1,1,3,602,7]dodecene-4, (or methyl-tetracyclododecene), 9-ethyl-tetracyclo[6,2,1,1 3,602,7]dodecene-4, (or ethyl-tetracyclododecene), 9-hexyl-tetracyclo[6,2,1,1 3,602,7]dodecene-4, 9-decyl-tetracyclo [6,2, 1,13,602,7]dodecene-4, 9-decyl-tetracyclo[6,2,1,1 3,602,7]dodecene-4, 9,10-dimethyl-tetracyclo[6,2,1,1 3,602,7]dodecene-4, 9-methyl-10-ethyl-tetracyclo-[6,2,1,1 3,602,7]dodecene-4, 9-cyclohexyl-tetracyclo[6,2,1,13,602, 7]dodecene-4, 9-chloro-tetracyclo[6,2,1,1 3,602,7] dodecene-4, 9-bromo-tetracyclo[6,2, 1,1 3,602,7]dodecene-4, 9-fluoro-tetracyclo[6,2, 1,13,602,7]dodecene-4, 9-isobutyl-tetracyclo[6,2,1,13,602,7]dodecene-4, and 9,10-dichloro tetracyclo[6,2,1,13,602,7]dodecene-4. Acyclic olefin comonomers are typically olefins such as ethylene, propylene and the like.

Polymers comprising two or more different cyclic types of monomeric units are also suitable. For example, copolymers of methyltetracyclododecane (MTD) and methylnorbornene (MNB) are especially suitable. More preferably, the polymers comprise three or more different types of monomeric units, e.g., terpolymers, including MTD, MNB and dicyclopentadiene (DCPD).

Ring opening metathesis polymers can also be used in the process of the present invention and include polymers prepared by metathesis ring opening (co)polymerization of a norbornene or tetracyclododecene, such as those described in JP-85/26,024 and U.S. Pat. No. 5,053,471 which is incorporated herein by reference. Methods of hydrogenating such polymers are well known by those skilled in the art.

Other additives may also be included in the above identified polymer compositions including heat stabilizers, mold release agents, flow aids, UV stabilizers, processing aids such as mineral oil, and the like. Polymer blends can also be used, such as blends of hydrogenated vinyl aromatic homopolymer blended with hydrogenated vinyl aromatic/conjugated diene block copolymer, blends of different hydrogenated block copolymers and the like.

The process of the present invention can be used to produce DVD's which are pre-recorded or rewriteable. Also, this process can be used to produce DVD's of varying densities, typically from 5 to 18 or more Gigabytes.

The DVD's produced by the process of the present invention have low birefringence in addition to good replication. Birefringence is measured by placing a molded DVD disc substrate between crossed polarizers and quarter wave plates (oriented in opposition). The birefringence is measured 20 mm from the injection gate of the disc using light from a 633 nm laser. Transmitted intensity is measured and the birefringence calculated using the following formula:

$I = I0 \sin 2(\pi/\lambda(\Delta nd))$ where Birefringence=$\Delta nd$

Measured intensity=I

Incident intensity=I0

Wavelength=$\lambda$

Preferably the birefringence is less than 25 nm, more preferably 20 nm, even more preferably less than 15 nm and most preferably less than 10 mn.

Typically, at least 75%, preferably at least 80%, more preferably at least 85% and most preferably at least 90% replication is achieved in order for a pre-recorded or rewriteable disc to be readable or writable. Replication refers to a process by which pits and/or a groove (surface features) are manufactured in the disc from a stamper. A stamper is a type of mold which contains the pit design carrying information in the case of pre-recorded discs or the groove design capable of holding information in the case of a rewriteable disc. Stampers used for pre-recorded discs contain columns having specified height, and left and right sidewall angles. The sidewall angle refers to the draft angle of the stamper surface feature(s). A column of the stamper forms a pit within the disc having a pit depth near or equal to the column height of the stamper and pit sidewall angles near or equal to the column draft angles. For rewritable discs, the stampers contain a surface feature capable of producing a groove having a specified groove depth, left and right draft angles as described previously.

The following examples are provided to illustrate the present invention. The examples are not intended to limit the scope of the present invention and they should not be so interpreted. Amounts are in weight parts or weight percentages unless otherwise indicated.

EXAMPLE 1

A hydrogenated styrenelbutadiene pentablock copolymer with a molecular weight of 60,000 as measured by gel permeation chromatography (GPC), containing 15 weight percent butadiene with a 1,2 content of 10 percent, is injection molded using a 600 Newton clamp force injection molding machine capable of high pressure, high speed injection molding (Netstal Disjet 600) configured for standard injection molding. The machine is equipped with a DVD mold (available from AXXICON) with a cavity thickness of 0.6 mm.

Injection Molding conditions

Stamper: DVD5
Melt Temperature: 365° C.
Mold Temperature 60° C.
Hold Pressure 55 MPa for 0.15 sec
48 MPa for 0.05 sec
34 MPa for .2 sec
10 MPa for .3 sec
3 MPa for .1 sec
Cooling Time 6 sec

| From screw position to screw position | speed |
|---|---|
| 16.2 to 14.1 (mm) | 157 (mm/s) |
| 14.1 to 12.8 | 176 |
| 12.8 to 11.2 | 166 |

-continued

| | |
|---|---|
| 11.2 to 6.6 | 146 |
| 6.6 to 3.8 | 110 |
| 3.8 to 2.7 | 94 |
| 2.7 to 1.6 | 78 |
| 1.6 to 1.0 | 40 |

Results

Birefringence is measured by placing a molded DVD disc substrate between crossed polarizers and quarter wave plates (oriented in opposition). The birefringence is measured 20 mm from the injection gate of the disc using light from a 633 nm laser.

Transmitted intensity is measured and the birefringence calculated using the following formula:

$I = I0 \sin2(\pi/\lambda(\Delta nd))$ where Birefringence=$\Delta$nd

Measured intensity=I

Incident intensity=I0

Wavelength=$\lambda$

Birefringence<25 mn

Replication, Pit Depth middle of data area 92% of stamper, perimeter 91% of stamper, Left Wall of pit, middle of data 103%, perimeter 92%

Right wall of pit middle of data 97%, perimeter 100%

Replication measurements are made using Tapping Mode Atomic Force Microscopy.

Therefore, an acceptable DVD is made using injection molding without compression.

What is claimed is:

1. A process for producing a Digital Versatile Disc (DVD), having a disc layer thickness of approximately 0.6 mm, comprising injection molding a polymer having 1) a glass transition temperature (Tg) of greater than 110° C. as measured by Differential Scanning Calorimetry (DSC) at 10° C./min.;

2) an elastic modulus (G') of less than or equal to 1000 dynes/cm$^2$ at a temperature of 240° C., as measured by Dynamic Mechanical Spectroscopy measurements at a temperature ramp rate of 3° C./min.; and 3) a shear rate of 1 radian/sec using a parallel plate geometry (under nitrogen), and a complex viscosity (Eta*) of less than 2000 poise, as measured according to Dynamic Mechanical Spectroscopy measurements, using shear rate sweeps at 280° C., and a shear rate of 1 radian/sec using a parallel plate geometry (under nitrogen);

into a DVD mold, without the use of compression.

2. The process of claim 1, wherein the polymer is a saturated hydrocarbon thermoplastic.

3. The process of claim 2, wherein the saturated hydrocarbon thermoplastic is a hydrogenated aromatic/conjugated diene block copolymer, comprising at least two hydrogenated aromatic polymer blocks and at least one conjugated diene polymer block.

4. The process of claim 3, wherein the hydrogenated aromatic polymer block is a hydrogenated polystyrene block.

5. The process of claim 3, wherein the hydrogenated conjugated diene polymer block is a hydrogenated polybutadiene, polyisoprene or mixture thereof.

6. The process of claim 3, wherein the hydrogenated aromatic/conjugated diene block copolymer is a pentablock copolymer comprising five alternating blocks, wherein the blocks consist of three hydrogenated vinyl aromatic polymer blocks and two hydrogenated conjugated diene polymer blocks.

7. The process of claim 1, wherein the polymer is a cyclic olefin copolymer.

8. The process of claim 1, wherein the polymer is a hydrogenated ring opening metathesis polymer.

* * * * *